United States Patent
Gutman

[11] 4,076,295
[45] Feb. 28, 1978

[54] PEDESTRIAN CONTACT GUARD

[76] Inventor: David Gutman, 503 Reed St., Philadelphia, Pa. 19147

[21] Appl. No.: 674,931

[22] Filed: Apr. 8, 1976

[51] Int. Cl.² .................................................. B60R 21/14
[52] U.S. Cl. ..................................... 293/71 R; 293/73; 293/80; 293/90
[58] Field of Search ................. 293/71 R, 87, 80, 81, 293/86, 90, 99, 100, 64, 73; 248/295

[56] References Cited

U.S. PATENT DOCUMENTS

| | | | |
|---|---|---|---|
| 1,407,637 | 2/1922 | Coletta | 293/90 X |
| 1,610,516 | 12/1926 | Harvey | 293/87 |
| 1,704,768 | 3/1929 | Sigman | 293/71 R |
| 1,727,982 | 9/1929 | Jacobs | 293/71 R |
| 1,926,994 | 9/1933 | Boer | 248/295 |
| 2,893,666 | 7/1959 | Cousins | 248/295 X |

*Primary Examiner*—Trygve M. Blix
*Assistant Examiner*—Sherman D. Basinger
*Attorney, Agent, or Firm*—Morton J. Rosenberg

[57] ABSTRACT

A pedestrian contact guard adapted to be mounted to a bumper of a vehicle for yieldingly contacting a pedestrian prior to the vehicle bumper impacting the pedestrian. The pedestrian contact guard is secured to the vehicle bumper on opposing transverse ends through a pair of block members which are secured to the bumper. A pair of vertically extending column elements are secured to the block members through set screws which allow vertical adjustment of the pedestrian contact guard. A lower end of the column elements are connected to a transversely extending tubular member which passes in the transverse direction between the securing block members. The tubular member is positioned forward of the vehicle bumper and is adapted to contact the pedestrian prior to the pedestrian being hit by the vehicle bumper.

1 Claim, 3 Drawing Figures

PEDESTRIAN CONTACT GUARD

BACKGROUND OF THE INVENTION

1. Field of the Invention

This invention pertains to devices attached to vehicles. In particular, this invention relates to pedestrian safety devices attached to vehicles. Still further, this invention pertains to safety devices which initially impact the pedestrian prior to the pedestrian being hit by the vehicle bumper. More in particular, this invention pertains to pedestrian safety devices mounted to a vehicle which yieldingly engage a pedestrian prior to the pedestrian being hit by the vehicle.

2. Prior Art

Safety devices for pedestrian welfare are known in the art. However, in some prior devices, such safety mechanisms are merely extensions of the forward portion of the vehicle. Such prior extensions often times are rigid in nature and cause the same basic impact loading on the pedestrian that a bumper of the vehicle or other forward projecting portion of the vehicle would be. Thus, the impact loading on the pedestrian would still cause injury.

In some other prior systems, the pedestrian is contacted by a hard interface and is directed or thrown onto the front of the vehicle which may still cause injury. Thus, in such case the pedestrian is inflicted with impact loading when he falls or is thrown onto the forward portion of the vehicle.

In some prior systems, spring mechanisms were utilized to prevent bumper contact with the pedestrian. However, helical springs have a tendency of not providing sufficient resistive force and may result in the pedestrian still being struck by the vehicle bumper. Additionally, in some such prior systems, the bumper guards were not vertically adjustable which resulted in a restrictive use of such systems.

SUMMARY OF THE INVENTION

A pedestrian contact guard which is adapted to be mounted to a transversely directed bumper. The contact guard includes a bumper securing mechanism which is rigidly secured to the bumper. A vertical support mechanism extends in a vertically downward direction with the support mechanism being securely fastened on a first end thereof to the bumper securing mechanism. A pedestrian contact device is secured to the vertical support mechanism on a second end thereof and the pedestrian contact mechanism is adapted in contour to extend forward of the bumper for initial contact of the pedestrian.

DESCRIPTION OF THE PREFERRED EMBODIMENTS

Figure 1:
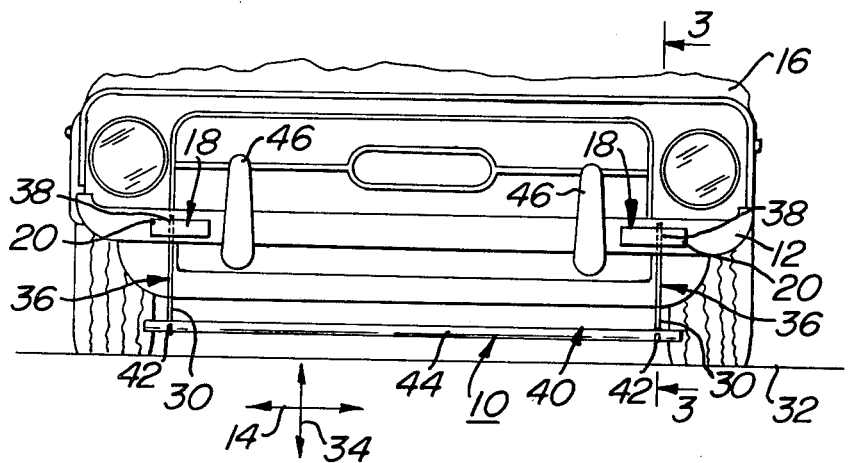
FIG. 1 is a front view of the pedestrian contact guard mounted to a vehicle bumper.
Figure 2:
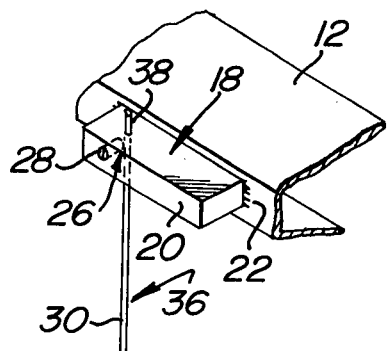
FIG. 2 is a perspective partially cut away view of a section of the pedestrian contact guard; and, FIG. 3 is a sectional view of the pedestrian contact guard taken along the sectional lines 3—3 of FIG. 1.
Figure 3:
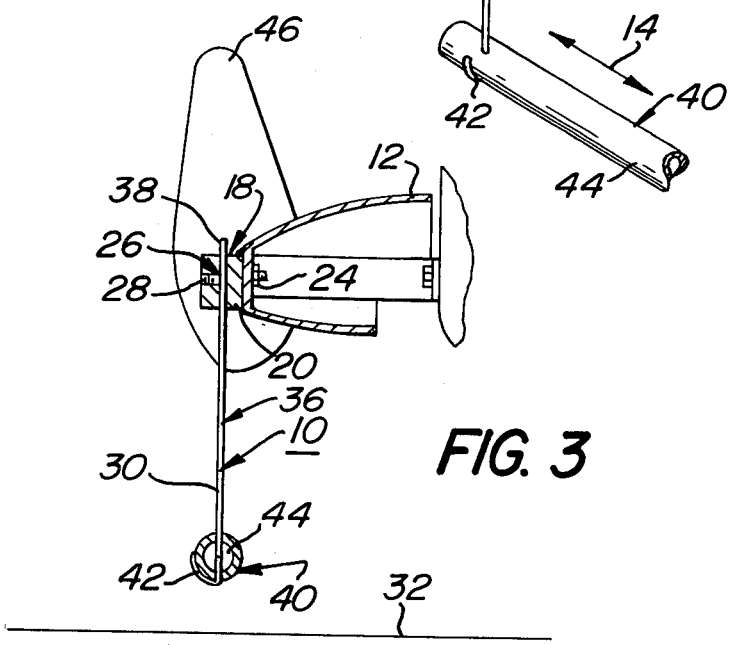

Referring now to FIGS. 1–3 there is shown pedestrian contact guard 10 which is adapted to be mounted to bumper 12 which extends in transverse direction 14. Contact guard 10 is contoured and positionally located to yieldingly engage the body of a pedestrian prior to the pedestrian coming in contact with bumper 12 of the vehicle 16. Bumper 12 of conventional vehicles 16 are generally rigid in structure and thus when a pedestrian is contacted, an impulse load occurs thus causing the pedestrian to be impacted with a high force loading. This may cause broken bones, deep bruises and other physically dilabating effects on the pedestrian. Pedestrian contact guard 10 springingly engages the pedestrian prior to bumper 12 contacting the body of the pedestrian. Thus, the pedestrian has an increased warning time to alert the vehicle driver that contact has been made, as well as guard 10 having the effect of reducing the impulse loading to a force loading over a particular predetermined time interval such that the contact load will minimize injury to the pedestrian.

Pedestrian contact guard 10 includes bumper securing device 18 which is rigidly secured to bumper 12 on opposing transverse ends thereof. Securing device 18 includes bumper block members 20 which are displaced each from the other in transverse direction 14 as is shown in FIG. 1. Bumper blocks 20 may be made of steel, or some like material not important to the inventive concept as is herein developed with the exception that the material chosen for blocks 20 have sufficient structural integrity to absorb the load of a pedestrian being struck. Blocks 20 may be welded as shown by element numeral 22, be secured by bolts 24 or some combination of the securing mechanisms.

Bumper securing device 18 includes vertical adjustment mechanism 26 to permit predetermined adjusting of the vertical displacement of pedestrian contact guard 10 with respect to bumper 12 as is clearly shown in FIG. 3. Set screw 28 of adjustment device 26 passes partially through bumper blocks 20 in order to contact column members 30 to provide fixed adjustment of contact guard 10 in a vertical direction with respect to bumper 12 and base surface 32. Thus by partially removing set screws 28 from contact with column members 30, such members 30 may be moved in vertical direction 34 reversibly to allow adjustment of guard 10 dependent upon the height of bumper 12 above base surface 32.

Vertical support mechanism 36 as is seen in FIGS. 1–3 extends in a downward vertical direction 34 and is securely fastened on first end 38 to bumper securing device 18 through set screw 28 of vertical adjustment device 26. Vertical support mechanism 36 is formed of column members 30 which may be of spring material to allow reversible deformability in a direction normal to the plane of the front of vehicle 16. Column members 30 have been successfully constructed of spring steel having a diameter between one sixteenth–one eight inch thick. Other yieldable column materials may be utilized, with the basic consideration that such materials reversibly and yieldingly deform in the manner described when a force of approximately 35–100 pounds are applied. Utilizing this force loading criteria, tests have shown that this provides for a minimization of injury to a pedestrian when being struck by vehicle 16.

Pedestrian contact device 40 is secured to vertical support mechanism 36 on a second end 42 of column members 30. Contact device 40 includes a transversely extending tubular member 44 passing between column members 30 and attached thereto as hereinbefore been described. As is seen in FIG. 3, tubular member 44 passes forward of bumper 12 in order that it contact the pedestrian prior to any contact by bumper 12.

Positional location of vertical support mechanism 36 is formed forward of bumper 12 but within the overall contour of bumper guards 46. Interpretations of some federal regulations call for safety devices not to extend beyond the overall contour of bumper 12 and bumper guards 46. Additionally, tubular member 44 may be arcuate in nature to present a slightly bowed outward configuration and possibly follow a curved bumper outline.

Although this invention has been described in connection with specific forms and embodiments thereof, it will be appreciated that various modifications other than those discussed above may be resorted to without departing from the spirit or scope of the invention. For example, equivalent elemental structures may be substituted for those specifically shown and described, certain features may be used independently of other features, and in some cases, elements may be reversed all without departing from the spirit or scope of the invention as defined in the appended claims.

What is claimed is:

1. A pedestrian contact guard adapted to be mounted to a transversely directed bumper comprising:
    (a) bumper securing means rigidly secured to said bumper, said bumper securing means defining a pair of transversely displaced block members mounted to said bumper,
    (b) vertical support means extending in a vertically downward direction, said vertical support means including a pair of transversely displaced vertically directed column members each releaseably secured to a respective one of said block members, each of said column members being securely fastened on a first end thereof to said bumper securing means; and,
    (c) pedestrian contact means being secured to each of said column members of said vertical support means on a second end thereof, said pedestrian contact means adapted in contour to extend forward of said bumper for initial contact of said pedestrian, said second end of said vertical support means passing through said pedestrian contact means and is secured thereto, said column members being deformably displaced when contacted with a force load in the approximate range of 50–100 pounds thereby minimizing injury to said pedestrian when impacted by said pedestrian contact means.

* * * * *